United States Patent [19]
Liska

[11] 3,930,190
[45] Dec. 30, 1975

[54] BRUSHLESS DC MOTOR HAVING MULTIPLE STATOR WINDINGS

[75] Inventor: Manfred Liska, Nurnberg, Germany

[73] Assignee: Siemens Aktiengesellschaft, Munich, Germany

[22] Filed: June 21, 1974

[21] Appl. No.: 481,753

[30] Foreign Application Priority Data
June 29, 1973  Germany............................ 2333252

[52] U.S. Cl. ............................................... 318/254
[51] Int. Cl.² ......................................... H02K 23/00
[58] Field of Search............................ 318/138, 254

[56] References Cited
UNITED STATES PATENTS

| | | | |
|---|---|---|---|
| 3,348,109 | 10/1967 | Wright............................ | 318/254 X |
| 3,483,456 | 12/1969 | Brunner et al.................. | 318/254 X |
| 3,590,353 | 6/1971 | Kobayashi et al. ................ | 318/254 |
| 3,629,675 | 12/1971 | Porath ............................ | 318/254 X |
| 3,714,532 | 1/1973 | McCurry............................ | 318/254 |
| 3,767,986 | 10/1973 | Wada.............................. | 318/254 X |

*Primary Examiner*—G. Z. Rubinson
*Attorney, Agent, or Firm*—Kenyon & Kenyon Reilly Carr & Chapin

[57] ABSTRACT

A brushless d-c motor in which the phase windings are subdivided into several equal winding legs with a power transistor associated with each winding leg, the power transistors of the winding legs associated with each phase controlled by a common control device and with the winding legs belonging to each phase winding arranged in the stator in two groups of equal size opposite each other

2 Claims, 3 Drawing Figures

BRUSHLESS DC MOTOR HAVING MULTIPLE STATOR WINDINGS

BACKGROUND OF THE INVENTION

This invention relates to brushless d-c motors having permanent magnet rotors and stator windings comprising a plurality of phase windings in general, and more particularly to an improved stator winding arrangement for such a motor.

Brushless d-c motors of this general type in which the phase windings are Y-connected on one side and coupled to one side of a power source with the other side of each winding provided through a power transistor to the other side of the voltage source are well known. Generally, in such arrangements, each power transistor is controlled by a control device responsive to position transducers picking up the rotor position. Typical of a brushless d-c motor of this nature is that disclosed in German Auslegeschrift No. 1,638,538. In motors such as this, transistors are preferred for providing the commutator output stage since they are easier to control than thyristors. However, transistors have as a disadvantage their considerable smaller current carrying capacity as compared to thyristors. If the nominal current required in a brushless d-c motor exceeds the current carrying capacity of an individual transistor, the output stage must either be constructed with thyristors or several transistors must be connected in parallel. To design an electronic commutator using thyristors is economical only for large motor ratings because of the high cost of the control arrangement required to control the thyristors. Thus, in order to use transistors to control d-c motors which operate at a rated power exceeding that of the current carrying capacity of a single transistor, several transistors must be connected in parallel.

Such parallel connection however, requires that the current splitting between transistors be as even as possible. One arrangement for accomplishing this is shown on FIG. 2 of the German Auslegeschrift No. 2,047,934. In the arrangement disclosed therein, each parallel path has an inductance connected in series with its respective transistor. Although this works quite well, the additional inductances represent a considerable cost. In addition, FIG. 1 of the same reference illustrates sub-dividing the primary winding of a transformer into several partial windings and assigning a transistor to each partial winding. Again, although this arrangement can work, the current division depends greatly on the mutual coupling of the partial windings in that arrangement.

Thus, it is clear that there is a need for an improved arrangement for a brushless d-c motor having a power rating which requires parallel transistors and which can be accomplished without the need of additional control means or other components and still provides an even current division between transistors.

SUMMARY OF THE INVENTION

The present invention solves this problem by sub-dividing the phase windings into an even number of equal winding legs and assigning one power transistor to each winding leg. The power transistors of the winding legs of a single phase winding are connected to a common control device. Physically, the winding legs belonging to a phase winding are arranged in the stator in two groups of equal size diametrically opposite each other. These two groups are electrically connected in such a manner that the magnetic fluxes generated by them act in the same direction. Through this physical arrangement of winding legs of a single phase winding, mutual coupling of the winding legs is considerably reduced and an even current division thereby obtained. In accordance with the disclosed embodiment, and in order to minimize the control currents needed to control the power transistors, each winding leg has associated therewith two power transistors in an amplifier circuit.

In a further embodiment of the invention, a particularly advantageous control device is obtained by constructing the amplifier circuit with a first transistor controlled by the position transducer and having its collector emitter path connected to the d-c voltage source through a voltage divider connected to the collector. The collector and base of this transistor are connected to each other through a capacitor. A control transistor is provided having its base connected to the tap of the voltage divider and its emitter connected to the Y-point of the stator. Its collector is connected through collector resistors in parallel to the control electrodes of the power transistors associated with the winding legs of a phase winding.

DETAILED DESCRIPTION OF THE PREFERRED EMBODIMENT

Figure 1:
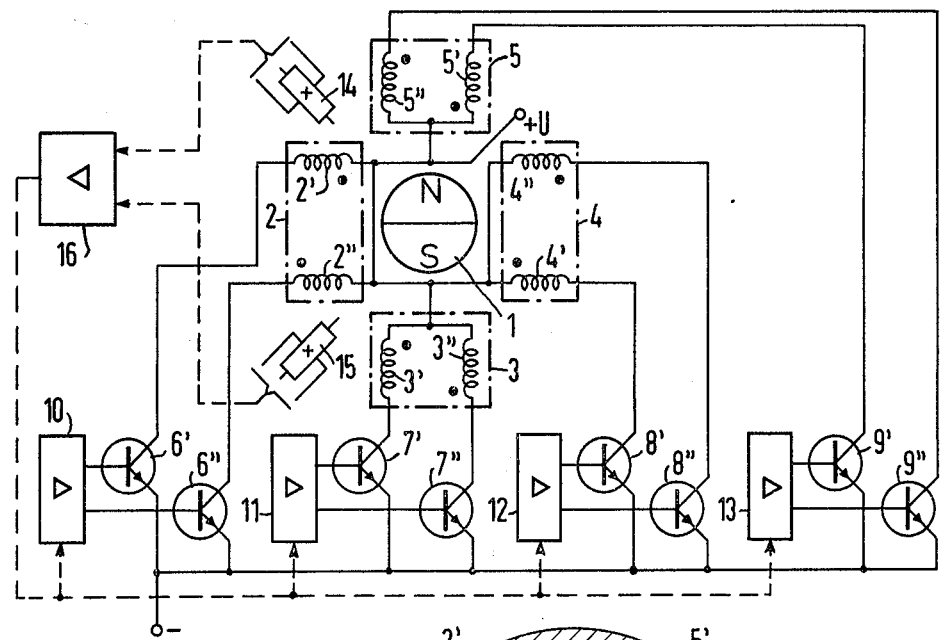
FIG. 1 is a circuit diagram of a brushless d-c motor according to the present invention.

On FIG. 1, the permanent magnet rotor 1 and having magnet poles indicated by N and S is shown. Surrounding the rotor are stator windings comprising four phase windings designated 2, 3, 4, and 5. As illustrated, each phase winding is sub-divided into two equal winding legs designated respectively 2' and 2'', 3' and 3'', 4' and 4'', and 5' and 5''. Each of the winding legs has one side connected with all other winding legs to form a Y connection which is then provided to the positive voltage source. The other side of each of the winding legs is coupled to the collector of a power transistor having its emitter coupled to the negative voltage supply. These power transistors are designated 6', 6'', 7', 7'', 8', 8'', 9' and 9''. The power transistors associated with the two winding legs of a phase are each controlled by a common control device. Thus, the transistors for the phase winding 2 are controlled by the control device 10, those for the phase winding 3 by the device 11, those for the phase winding 4 by the device 12, and those for the phase winding 5 by the device 13. Two Hall-effect generators 14 and 15 electrically displaced 90° with respect to each other are provided for sensing the position of the permanent magnet rotor 1 and providing appropriate outputs. These outputs are combined in conventional fashion in a rotor position transmitter 16 which then provides sequential outputs to the control devices 10, 11, 12 and 13 in well known fashion, i.e., the rotor position transmitter 16 amplifies the Hall-effect voltages, properly combines and shapes them, and feeds them in proper sequential order to the control devices 10 to 13 in order that the power transistor 6', 6'' to 9', 9'' connected to the control devices 10 to 13 are similarly controlled in proper sequential order in accordance with outputs from the position transmitter 16. For example, a circuit which may be used as rotor position transmitter 16 is disclosed in U.S. Pat. No. 3,714,532 in connection with FIG. 5. Specifically, the circuits 36 and 47 of FIG. 5 of that patent may be used with the inductors therein replaced by the Hall generators 14 and 15 of FIG. 1. In other words, the three outputs from each of the Hall generators 14 and 15, respectively, would be provided to two amplifiers in the manner shown with the amplifier outputs used directly and through inverter transistors to control the control devices 10 to 13 for the respective winding legs.

Figure 2:
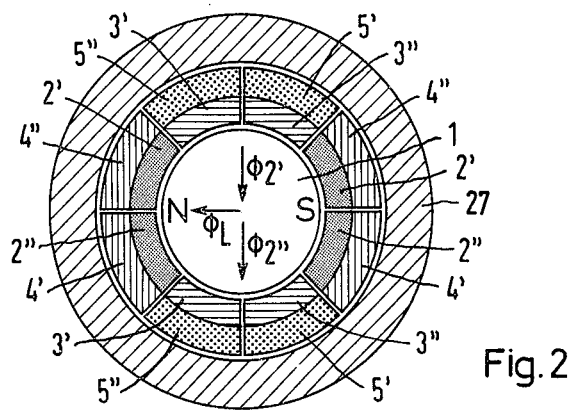
FIG. 2 is a cross sectional schematic view of the physical arrangement of the windings of the present invention.

FIG. 2 illustrates in a schematic cross sectional view the physical arrangement of the winding legs. The winding legs are given the same reference numeral designations as in FIG. 1. Thus, winding legs 2' and 2'' which make up the phase winding 2 are arranged diametrically opposite each other. In similar fashion, the other windings 3', 3'' to 5', 5'' are also arranged opposite each other. Magnetic fluxes $\phi_2'$ and $\phi_2''$ for the phase winding legs 2' and 2'' are shown. These fluxes which are generated by the two winding legs 2' and 2'' during the "on" time thereof return without appreciable stray fields through a magnetic return ring 27 surrounding the stator winding. On the figure, the magnetic flux of the permanent-magnet rotor 1 is indicated by $\phi_L$.

If the two winding legs of a phase winding are arranged in only one stator half, a considerably larger stray flux will result. With the illustrated physical arrangement, an optimum wave shape of the torque is obtained.

Figure 3:
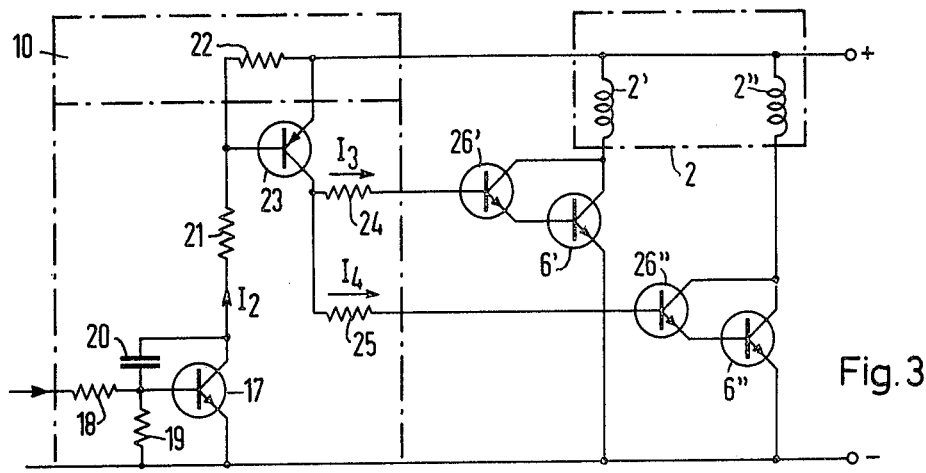
FIG. 3 is a schematic diagram of a control device for use in the embodiment of FIG. 1.

FIG. 3 illustrates a preferred control arrangement for controlling the power transistors such as power transistors 6' and 6''. Illustrated is the control device 10 associated with those two power transistors. The remaining control devices 11, 12 and 13 will, of course, be identical. As shown on FIG. 3, associated with each of the power transistors is an additional amplifier transistor. Thus, a transistor 26' is shown having its emitter connected to the base of the transistor 6' and its collector connected to the collector of transistor 6'. A transistor 26'' is similarly connected to transistor 6''. The bases of the transistors 26' and 26'' are connected to the control arrangement 10. Control arrangement 10 comprises a first transistor 17 which obtains at its base through an input resistor 18 the signal from the rotor position transmitter 16. Its base is coupled to its collector through a capacitor 20 and to the negative supply voltage through a resistor 19. Its emitter is connected also to the negative supply voltage. The collector of transistor 17 is connected through resistors 21 and 22 to the positive voltage source. A second transitor 23 is provided having its base connected to the voltage divider made up of the resistors 21 and 22 and its emitter connected to the positive voltage supply. Its collector is coupled through resistors 24 and 25 to the bases of the transistors 26' and 26'' respectively.

By sub-dividing the phase windings 2 through 5 and to several winding legs such as 2', 2'' to 5', 5'', current splitting is achieved in advance so that additional means for splitting the current are not required. The transistors associated with the winding legs of a phase winding do not influence each other as far as their switching characteristics are concerned so that the current carrying capacity increases proportionally to the number of winding legs provided and thus to the number of transistors. In addition, sub-dividing the phase windings into several winding legs has a further advantage in that the stator winding is easier to wind since the cross section of the wire has a corresponding increase for higher motor power due to the larger nominal currents. Wires with larger cross sections, however, are harder to work than several parallel connected wires of smaller cross section. Thus, by permitting the use of such smaller cross section wires, the arrangement of the present invention achieves a further advantage.

Thus, an improved winding arrangement for a brushless d-c motor of high power rating has been shown. Although a specific embodiment have been illustrated and described, it will be obvious to those skilled in the art that various modifications may be made without departing from the spirit of the invention which is intended to be limited solely by the appended claims.

What is claimed is:

1. In a brushless d-c motor of the type having a permanent magnet rotor and a stator winding made up of several phase windings with the phase windings Y-connected on one side and provided to one side of a voltage source with the other side of the phase windings coupled through individual power transistors to the other side of the voltage source with each power transistor controlled by a separate control device which is responsive to a rotor position transducer, an improved arrangement for providing such a motor with a power rating in excess of that obtainable through the use of a single transistor in each phase winding the improvement comprising:
   a. each phase winding sub-divided into an equal number of winding legs with the winding legs belonging to a phase winding arranged in the stator in two groups of equal size diametrically opposite each other with said two groups electrically connected in such a manner that the magnetic fluxes generated by them act in the same direction;
   b. the power transistors coupling said phase winding including a separate power transistor coupling each of the winding legs to the other side of the voltage source; and
   c. the separate control device for each phase winding coupled to simultaneously energize and deenergize all transistors associated with the legs making up an individual phase winding.

2. A d-c motor according to claim 1 wherein said control devices comprise:
   a. a first transistor having its base coupled to the position transducer and having its emitter coupled to one side of the power source and its collector coupled through a voltage divider to the other side of the power source and having a capacitor between its base and collector; and
   b. a second transistor having its base connected to the tap of said voltage divider, its emitter coupled to said other side of said voltage source and its collector coupled through parallel resistors to the power transistors associated with the legs of a phase winding.

* * * * *